(12) United States Patent
Williams

(10) Patent No.: US 6,874,589 B1
(45) Date of Patent: Apr. 5, 2005

(54) DECK MOUNTED AIR CLEANER ASSEMBLY FOR VEHICLE

(75) Inventor: Zack R. Williams, Broken Arrow, OK (US)

(73) Assignee: Crane Carrier Company, Tulsa, OK (US)

( * ) Notice: Subject to any disclaimer, the term of this patent is extended or adjusted under 35 U.S.C. 154(b) by 47 days.

(21) Appl. No.: 10/319,942

(22) Filed: Dec. 16, 2002

(51) Int. Cl.$^7$ .............................................. B60K 13/02
(52) U.S. Cl. ................. 180/68.3; 180/68.1; 180/89.18
(58) Field of Search ....................... 180/68.1, 68.2, 180/68.3, 69.21, 89.12, 89.13, 89.14, 89.16, 89.17, 89.18, 89.19, 69.2

(56) References Cited

U.S. PATENT DOCUMENTS

| | | | |
|---|---|---|---|
| 2,203,407 A | * 6/1940 | Donaldson | 123/198 R |
| 2,769,501 A | 11/1956 | Wagner | 180/68 |
| 2,920,829 A | * 1/1960 | Shane | 237/12.3 A |
| 3,057,428 A | 10/1962 | Johnson | 180/69 |
| 3,641,744 A | * 2/1972 | Culbert et al. | 55/319 |
| 3,670,480 A | * 6/1972 | Petersen | 55/430 |
| 3,925,044 A | * 12/1975 | Tu et al. | 55/337 |
| 3,933,216 A | 1/1976 | Irwin | 180/54 |
| 3,973,937 A | * 8/1976 | Petersen | 55/449 |
| 3,986,574 A | 10/1976 | Irvine | 180/69 |
| 4,013,137 A | * 3/1977 | Petersen | 180/68.3 |
| 4,071,009 A | 1/1978 | Kraina | 123/198 |
| 4,080,184 A | * 3/1978 | Petersen | 55/315 |
| 4,097,256 A | 6/1978 | Borsheim | 55/429 |
| 4,137,983 A | 2/1979 | Gray | 180/69 |
| 4,249,922 A | * 2/1981 | Saele | 55/315 |
| 4,338,890 A | 7/1982 | Shelby et al. | 123/195 |
| 4,378,945 A | * 4/1983 | Trautman | 277/608 |
| 4,388,976 A | 6/1983 | Williams et al. | 180/69 |
| 4,469,490 A | 9/1984 | Wilson | 95/269 |
| 4,505,348 A | * 3/1985 | Gadefelt et al. | 180/89.14 |
| 4,567,956 A | 2/1986 | Matsuda et al. | 180/68 |
| 4,932,490 A | 6/1990 | Dewey | 180/68 |
| 5,022,479 A | 6/1991 | Kiser et al. | 180/68 |
| 6,361,574 B1 | * 3/2002 | Decker | 55/317 |

* cited by examiner

*Primary Examiner*—Christopher P. Ellis
*Assistant Examiner*—Christopher Bottorff
(74) *Attorney, Agent, or Firm*—Head, Johnson & Kachigian

(57) ABSTRACT

A deck mounted air cleaner assembly for a vehicle having a deck with an external and an internal face. The deck is pivotal about an axis. The assembly includes an air filter mounted on the external face of the deck. A clean air duct extends from the air filter and passes through an opening in the deck to an engine. A flexible portion of the duct between the deck and the engine is provided wherein pivotal movement of the deck translates into movement of the air filter.

4 Claims, 3 Drawing Sheets

DECK MOUNTED AIR CLEANER ASSEMBLY FOR VEHICLE

BACKGROUND OF THE INVENTION

1. Field of the Invention

The present invention is directed to a deck mounted air cleaner assembly for a vehicle which is mounted on the external face of the deck and which is in fluid communication with the engine beneath the deck. In particular, the present invention is directed to a deck mounted air cleaner assembly with a pivotal deck wherein the air cleaner will pivot along with the deck.

2. Prior Art

In various types of vehicles, such as terminal tractors and other large vehicles, it is advantageous to provide an air filter in advance of the air intake to an internal combustion engine of the vehicle. Terminal tractors, for example, are utilized to move trailers in a yard and include decks to cover an internal combustion-engine. The tractor will operate in various environmental conditions to maneuver in confined areas and will alternate between light loads and heavy loads. The air filter or air cleaner is especially desirable in dusty and dirty locations to clean the air before its entry into the engine. In dirty or dusty conditions, a cleanable or replaceable element must be serviced frequently. While the air filter may be located beneath a deck or a hood of the vehicle, this location is often subject to worse conditions.

In some instances, an air cleaner assembly has been mounted above or externally to the deck or hood. This arrangement provides two advantages—the air cleaner is above and away from dusty conditions and is more readily accessible without having to open or remove the hood or deck. In those cases, however, it has sometimes been necessary to dismantle the air cleaner assembly prior to opening the deck or hood. Alternatively, the deck or portions of the deck are stationery where the air cleaner assembly has been added to avoid interrupting the connection to the engine.

In other prior arrangements, an air cleaner has been mounted vertically in line with an air intake stack pipe. Examples of such an arrangement are seen in refuse trucks.

Other arrangements have also been suggested. Dewey (U.S. Pat. No. 4,932,490) discloses an arrangement wherein the air cleaner is mounted beneath the hood with the air duct being a part of the hood.

Irwin (U.S. Pat. No. 3,933,216) discloses an externally mounted air cleaner 56 and an air intake pipe 51.

Gray (U.S. Pat. No. 4,137,983) discloses a sectionalized hood or deck for a vehicle.

It would,be advantageous to provide an air cleaner assembly which is externally mounted on a deck while allowing for pivotal movement of the deck.

It would also be advantageous to provide an aircleaner assembly which is externally mounted on a deck but does not interfere with access to components beneath the deck.

SUMMARY OF THE INVENTION

The present invention is directed to a deck mounted air cleaner assembly for a vehicle. The vehicle includes a deck having an external face and an opposed internal face with an internal combustion engine located beneath a cab and the deck.

The air cleaner assembly includes an air cleaner or air filter which is mounted on an external face of the deck. The air cleaner includes a replaceable or cleanable element. The air cleaner is mounted to the external face of the deck by a mounting bracket or brackets. A pair of straps secures the air cleaner to the mounting brackets. The air cleaner includes an end cap which is removable in order to access and replace or clean the filter element. The air cleaner also includes a hood extending radially from the air cleaner. With the air cleaner mounted to the external face of the deck, it is readily accessible for servicing without opening the deck. Extending from an end of the air cleaner opposed to the end cap is the clean air side of the air filter which is in fluid communication with a clean air duct in the form of an elbow. The elbow is connected to a tube passing through the deck from the external to the internal face.

Extending beneath the deck, the tube is connected to a flexible hose which is capable of being positioned in multiple angle positions and is capable of being extended in length.

The flexible hose is, in turn, in fluid communication with a tube which directs inlet air to the air inlet of the motor vehicle engine. The tube is secured to the frame of the vehicle by a clamp or clamps which are secured to a bracket. As the deck moves from a closed to an open position, the air cleaner will move therewith and the flexible hose will adjust in its angular orientation and in its length. Accordingly, the clean air system will not be interrupted by movement of the deck between the opened and closed position.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
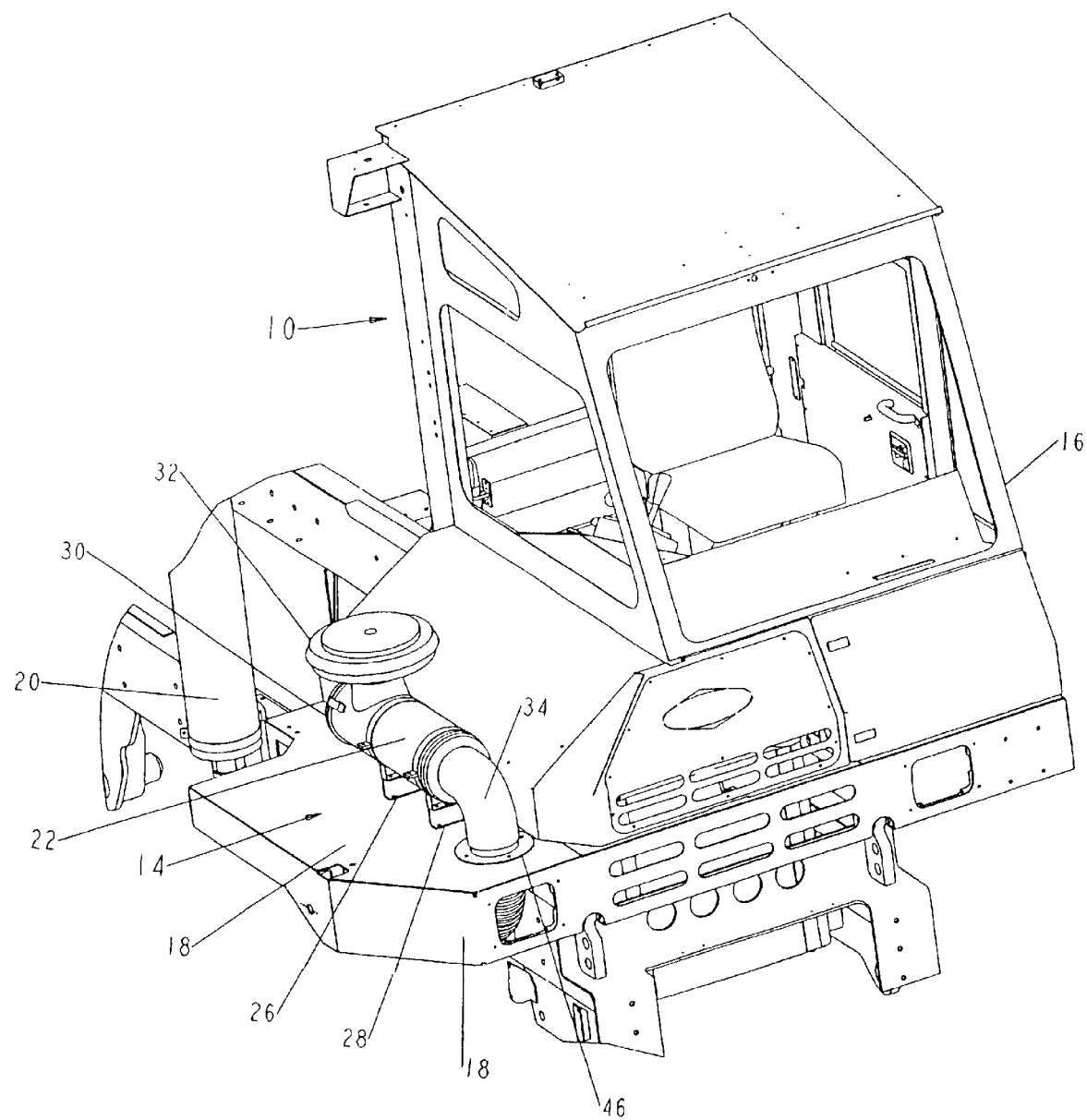
FIG. 1 illustrates a partial, perspective view of a terminal tractor vehicle employing a deck mounted air cleaner assembly constructed in accordance with the present invention.

Referring to the drawings in detail, FIG. 1 illustrates a partial view of a terminal tractor vehicle 10 employing the deck mounted air cleaner assembly 14 of the present invention. The tractor 10 includes an offset cab 16 for an operator, a deck 18 and an exhaust stack 20. The deck 18 has an external face visible in FIG. 1 and an opposed internal face. The internal combustion engine will be located beneath the cab and the deck. It will be understood that the air cleaner assembly may be employed with other vehicles within the scope of the invention.

The air cleaner assembly 14 includes an air cleaner or air filter 22 which is mounted on an external face of the deck 18. In the present embodiment, the air cleaner 22 is cylindrical in shape and receives a replaceable element (not visible) which may be replaced once the filter has accumulated dust, dirt and other debris. It will be understood that the present invention may also be employed with an air cleaner having a cleanable element.

The air cleaner 22 is mounted to the external face of the deck by a mounting bracket or mounting brackets 26 and 28. A pair of straps 24 and 25 secure the mounting brackets to the air cleaner.

Figure 2:
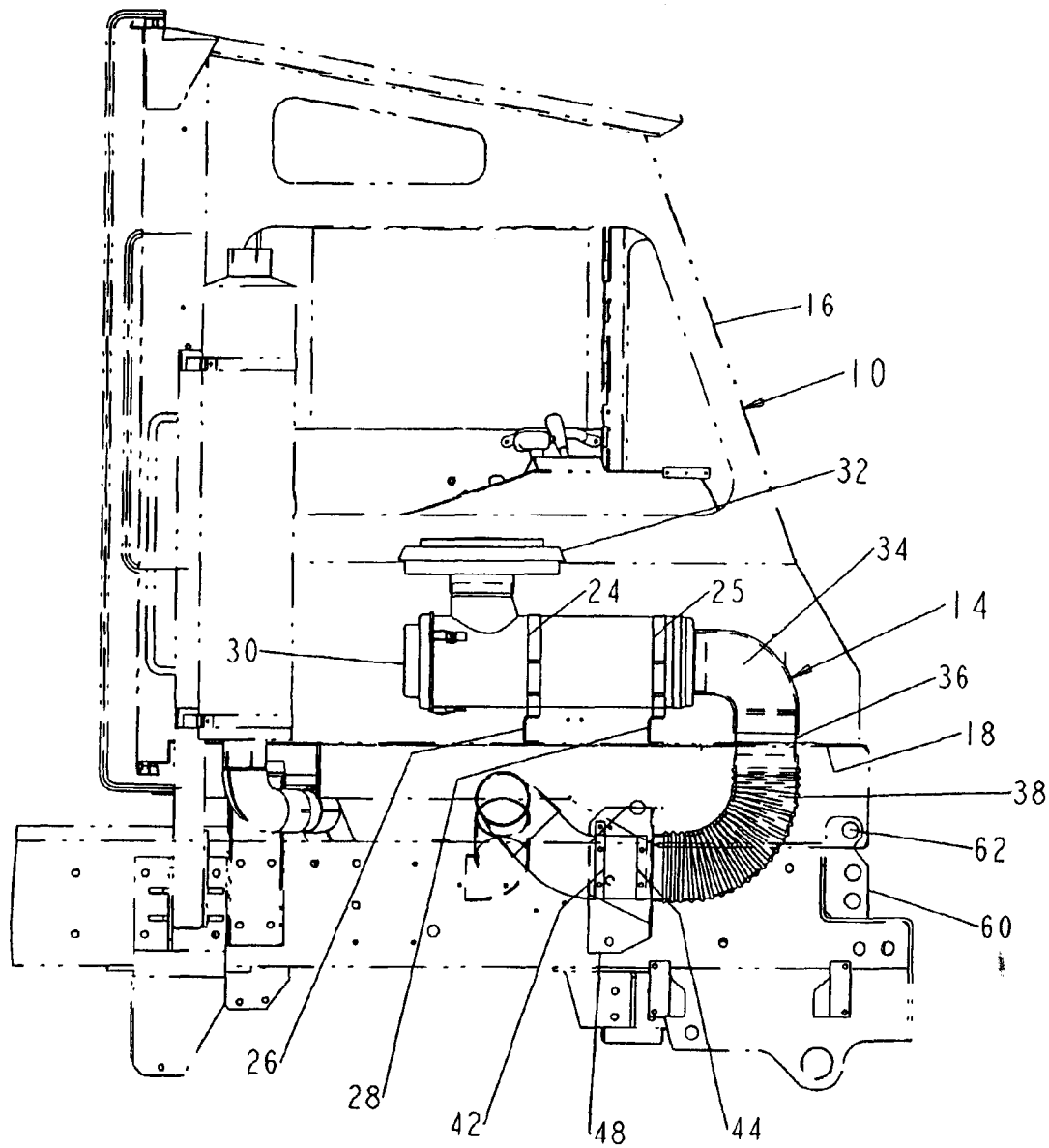
FIG. 2 illustrates a side view of the air cleaner assembly of the present invention shown in FIG. 1 mounted on a deck.
Figure 3:
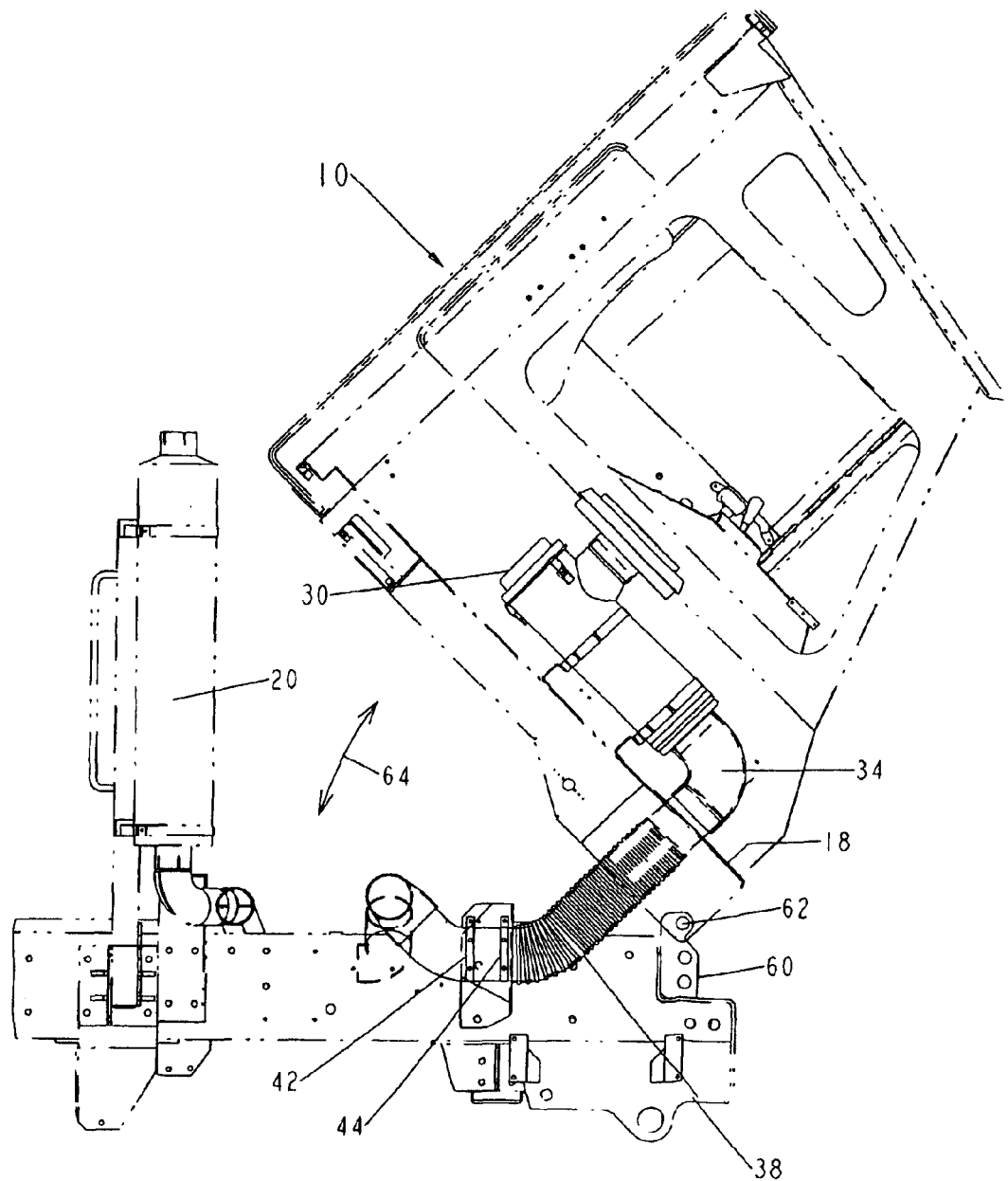
FIG. 3 shows the air cleaner assembly of the present invention shown in FIG. 2 with the deck in the open position.

FIG. 2 illustrates a side view of the air cleaner assembly 14 in position with the terminal tractor cut away for ease of visibility while FIG. 3 illustrates a side view as shown in FIG. 2 with the cab and deck pivoted to an open position to access the internal combustion engine of the vehicle.

The air cleaner assembly 14 includes an end cap 30 which is removable in order to access and replace or clean the filter element. The air cleaner assembly 14 also includes a hood 32 extending radially from the air cleaner 22. With the air cleaner 22 mounted to the external face of the deck, it is readily accessible for servicing without opening the deck.

Extending from the air cleaner 22 from an end opposed to the end cap 30, is the clean air side of the air filter 22 which is in fluid communication with a clean air duct in the form of an elbow 34. The elbow is in fluid communication with a metal tube 36 that passes through the deck 18 from the external to internal face. The clean air duct tube 36 has radially extending flange 46 which mates with and is secured to the deck 18.

Extending beneath the deck 18, the tube 36 is in fluid communication with a flexible hose 38. In the present embodiment, the flexible hose 38 is an accordion hose composed of thermoplastic urethane with a wire helix reinforcement. The flexible hose 38 is capable of being positioned in multiple angular positions and is capable of being extended in length. It will be understood that other types of flexible hoses may be employed within the scope of the invention.

The flexible hose is, in turn, in fluid communication with a tube 40 which directs inlet air to the air inlet of the motor vehicle engine. The tube 40 is secured to the frame of the vehicle by a clamp or clamps 42 and 44 which are secured to a bracket 48.

By way of the present arrangement, clean air is directed into the air cleaner 22, through the elbow 34, through the metal clean airduct tube 36 through the flexible hose 38, and through the tube 40 into the air inlet of the motor vehicle.

In the event that the deck 18 of the motor vehicle is to be opened, the deck 18 will pivot about hinge 60 about pivot point 62.

The deck 18 will swing radially away to provide access to the engine and other components of the vehicle as illustrated by arrow 64. At the same time, the air cleaner 22 will move along with the deck 18 as it is affixed to the exterior face of the deck. Accordingly, it will not be necessary to remove or disconnect the air filter when the deck is to be opened.

As best seen in FIGS. 2 and 3, the flexible hose 38 will adjust in its angular orientation and in its length as the deck moves from the closed position to the open position. Accordingly, the clean air system will not be interrupted by movement of the deck.

Whereas, the present invention has been described in relation to the drawings attached hereto, it should be understood that other and further modifications, apart from those shown or suggested herein, may be made within the spirit and scope of this invention.

What is claimed is:

1. A deck mounted air cleaner assembly for a terminal tractor vehicle having a deck with an external and an internal face, said deck pivotable about an axis, which assembly comprises;

an air filter mounted on said external face of said deck, said air filter having a replaceable element and a removable end cap;

a clean air duct extending from said air filter and passing through an opening in said deck to an engine;

a rigid portion of said duct between said deck and said engine, said rigid portion secured to said vehicle by a bracket;

a flexible portion of said duct between said deck and said engine in communication with said rigid portion, including a hose movable to multiple angular positions and extendable in length, wherein pivotable movement of said deck translates into movement of said air filter.

2. A deck mounted air cleaner assembly as set forth in claim 1 including a mounting bracket securing said air filter to said external face of said deck.

3. A deck mounted air cleaner assembly as set forth in claim 1 wherein said deck pivots radially about said axis from a horizontal closed position to an open position.

4. A deck mounted air cleaner assembly for a terminal tractor vehicle having a deck with an external and an internal face, which assembly comprises:

an air filter mounted with a mounting bracket on said external face of said deck, said air filter having a replaceable element and a removable end cap;

a clean air duct extending in fluid communication from said air filter and passing through an opening in said deck to communicate with an engine; and means to radially pivot said deck from a horizontal closed position to an open position without interfering with said clean air duct and while said air filter remains mounted to said deck, including a rigid portion of said duct between said deck and said engine, said rigid portion secured to said vehicle by a bracket, and a flexible portion of said duct in communication with said rigid portion.

* * * * *